US012179851B2

United States Patent
Kohler et al.

(10) Patent No.: US 12,179,851 B2
(45) Date of Patent: Dec. 31, 2024

(54) POWER-ASSISTED STEERING SYSTEM FOR A MOTOR VEHICLE

(71) Applicants: thyssenkrupp Presta AG, Eschen (LI); thyssenkrupp AG, Essen (DE)

(72) Inventors: Christian Kohler, Heiligkreuz (CH); Felix Vonier, Schruns (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 648 days.

(21) Appl. No.: 17/431,786

(22) PCT Filed: Feb. 17, 2020

(86) PCT No.: PCT/EP2020/054007
§ 371 (c)(1),
(2) Date: Aug. 18, 2021

(87) PCT Pub. No.: WO2020/169495
PCT Pub. Date: Aug. 27, 2020

(65) Prior Publication Data
US 2022/0135115 A1    May 5, 2022

(30) Foreign Application Priority Data
Feb. 18, 2019 (DE) ............... 10 2019 202 142.5

(51) Int. Cl.
*B62D 5/04* (2006.01)
*F16C 35/04* (2006.01)
*F16H 57/00* (2012.01)

(52) U.S. Cl.
CPC ......... *B62D 5/0403* (2013.01); *B62D 5/0409* (2013.01); *F16C 35/042* (2013.01); *F16H 57/0006* (2013.01); *F16C 2326/24* (2013.01)

(58) Field of Classification Search
CPC ... B62D 5/0403; B62D 5/0409; F16C 35/042; F16C 2326/24; F16H 57/0006
See application file for complete search history.

(56) References Cited

U.S. PATENT DOCUMENTS 6,520,042 B2 * 2/2003 Jammer ............... F16H 1/16
74/411
8,087,830 B2 * 1/2012 Hafermalz ........... F16C 35/077
384/537

(Continued)

FOREIGN PATENT DOCUMENTS

DE    10 2008 009 107 A1    8/2009
DE    10 2008 042 477 A1    4/2010

(Continued)

OTHER PUBLICATIONS

"Keil-Vorspannsystem", Aug. 1, 2022, cited in corresponding EP Application No. EP20705695.3, Notification according to Rule 114 (2) EPC (Third Party Observations), no translation available, dated Aug. 8, 2022.

(Continued)

*Primary Examiner* — Tony H Winner
(74) *Attorney, Agent, or Firm* — thyssenkrupp North America, LLC

(57) ABSTRACT

An electromechanical power steering system for a vehicle may include a worm that can be driven rotationally about a drive axis by an electric motor, that interacts with a worm gear that is coupled to a steering shaft, and that is mounted such that it can be rotated about the drive axis in a bearing that is held in a holder. The holder may be movable relative to the worm gear. To make a decreased development of noise possible, the holder has a core element that is made from a core material and is connected to at least one contact element. The contact element may be made from a soft (Continued)

material that can be deformed elastically more easily and is softer relative to the core material.

12 Claims, 3 Drawing Sheets

(56) References Cited

U.S. PATENT DOCUMENTS

| | | | | |
|---|---|---|---|---|
| 8,307,938 | B2* | 11/2012 | Tokura | B62D 5/0409 |
| | | | | 180/443 |
| 8,667,858 | B2* | 3/2014 | Fuechsel | F16C 35/045 |
| | | | | 384/535 |
| 8,950,280 | B2* | 2/2015 | Lescorail | F16H 55/24 |
| | | | | 384/255 |
| 9,488,219 | B2* | 11/2016 | Fuechsel | B62D 3/12 |
| 9,988,071 | B2* | 6/2018 | Riepold | B62D 5/0421 |
| 2010/0116582 | A1* | 5/2010 | Rho | F16H 55/24 |
| | | | | 180/444 |
| 2014/0041475 | A1* | 2/2014 | Ko | B62D 3/04 |
| | | | | 74/427 |
| 2015/0360719 | A1 | 12/2015 | Kang | |
| 2017/0217476 | A1 | 8/2017 | Schlegel et al. | |
| 2020/0240508 | A1 | 7/2020 | Vonier | |

FOREIGN PATENT DOCUMENTS

| | | |
|---|---|---|
| DE | 10 2014 110 306 A1 | 1/2016 |
| DE | 20 2017 100 155 U1 | 3/2017 |
| DE | 102017218897 A1 | 4/2019 |
| WO | 2012/136315 A1 | 10/2012 |
| WO | 2019/081368 A1 | 5/2019 |

OTHER PUBLICATIONS

English Translation of International Search Report issued in PCT/EP2020/054007, dated May 7, 2020.

* cited by examiner

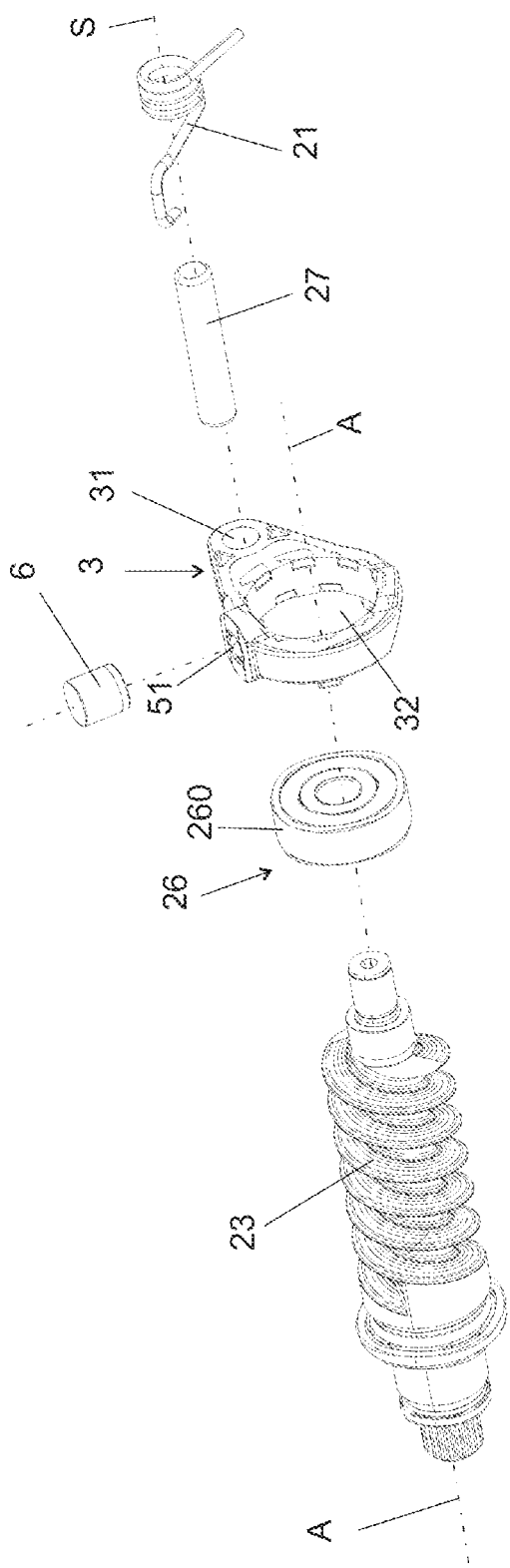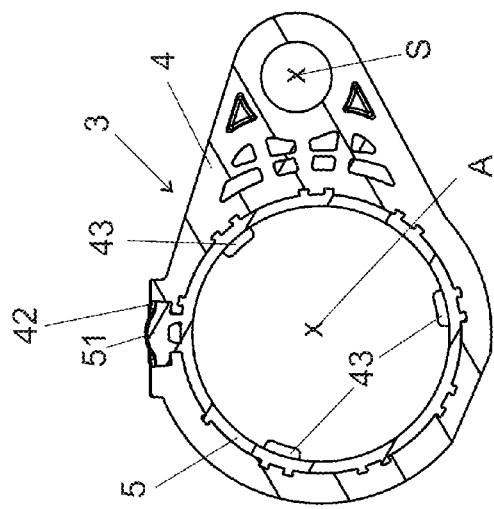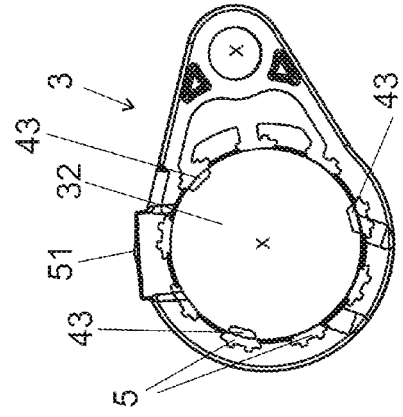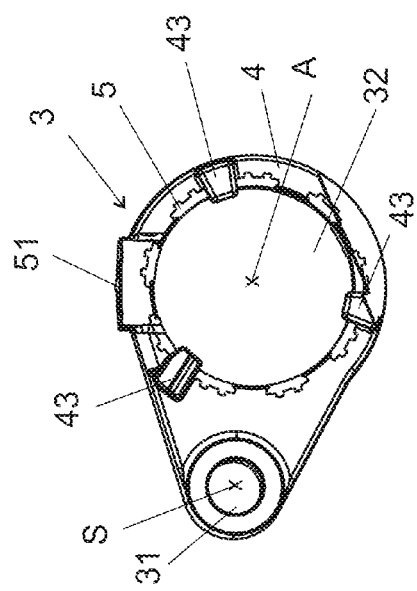

POWER-ASSISTED STEERING SYSTEM FOR A MOTOR VEHICLE

CROSS REFERENCE TO RELATED APPLICATIONS

This application is a U.S. National Stage Entry of International Patent Application Serial Number PCT/EP2020/054007, filed Feb. 17, 2020, which claims priority to German Patent Application No. DE 10 2019 202 142.5, filed Feb. 18, 2019, the entire contents of both of which are incorporated herein by reference.

FIELD

The present disclosure generally relates to adjustable steering columns, including power-assisted steering systems for motor vehicles.

BACKGROUND

In the case of power-assisted steering systems of motor vehicles, in addition to the manual steering torque which is introduced by the driver as a steering command into the steering shaft via the steering wheel which is attached on the input side, an additional auxiliary torque is coupled into the steering line, in order to assist the manual steering torque for a steering lock of the wheels.

In an electromechanical power steering system of the generic type, the manual steering torque is detected by means of a torque sensor, for example by way of measurement of the relative torsion of a torsion bar which is incorporated between an input shaft and an output shaft of the steering shaft. The required power assistance is determined in an electric control unit in a manner which is dependent on the measured steering torque, and an electric actuating drive is actuated correspondingly. The actuating drive has an electric motor for the generation of an auxiliary torque which is coupled into the steering shaft.

In accordance with the generic type, the auxiliary torque is coupled in via a worm gear mechanism which has a worm which is coupled to the motor shaft of the electric motor, engages into a worm gear, and can be driven by the motor rotationally about its drive axis (this is the worm axis). The worm gear is coupled to the steering shaft, for example to the output shaft, which can be coupled to the steering pinion of a steering gear, in which the steering pinion engages into a rack which converts a rotation of the steering shaft into a translational movement of track rods and, as a result, into a steering lock of the steered wheels.

In order to increase the smooth running, and in order to as far as possible avoid the formation of noise in the case of the load changes which are caused by way of the steering movements, it is known for the worm to be prestressed elastically in the direction of the toothing engagement, in the direction against the worm gear. An arrangement of this type is known in the prior art, for example, in DE 10 2014 110 306 A1. In said document, the worm is mounted rotatably at its end which is remote from the motor in a bearing which is received in a holder, in which a bearing ring which is coaxial with respect to the drive axis and forms an outer part of the bearing is attached fixedly so as not to rotate. The holder is attached movably in a mechanism housing of the worm gear mechanism, with the result that the bearing ring and therefore the worm can be moved in the direction against the toothing system of the worm gear, and can be prestressed into a play-free toothing engagement with the worm gear. A spring can be provided, for example, as prestressing element, which spring acts on the holder and presses the worm without play against the toothing system of the worm gear.

It is known from the above-cited DE 10 2014 110 306 A1 for the holder to be configured as a pivoting or eccentric lever which is mounted rotatably in a mechanism housing of the worm gear mechanism such that it can be pivoted about a pivot axis which is spaced apart from the drive axis. Undesired operating noise which impairs the smooth running can occur as a result of drive vibrations which are transmitted via the bearing to the holder, and by virtue of the fact that the holder comes into contact with the mechanism housing in the case of load changes.

Thus a need exists for an improved steering system with a decreased development of noise.

BRIEF DESCRIPTION OF THE FIGURES

FIG. 4 is perspective view with a partial section through the holder and a pivoting lever according to the invention of the holder according to FIG. 3 or 3a.

FIG. 8 is an exploded partial illustration of the gear mechanism according to FIG. 3.

FIG. 9 is an axial view in the direction of the drive axis of the pivoting lever according to FIG. 4 or 5.

FIG. 10 is an axial view in an opposite direction of the drive axis the pivoting lever according to FIG. 9.

FIG. 10a is a sectional illustration of the pivoting lever according to FIG. 9 in an opposite direction of the drive axis.

DETAILED DESCRIPTION

Figure 1:
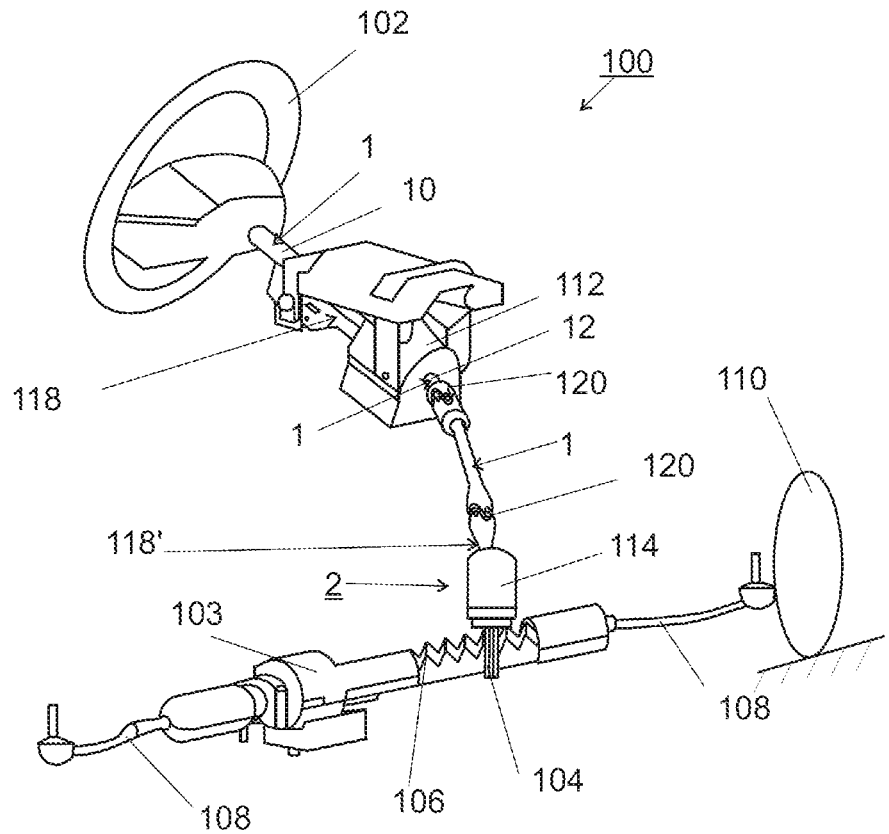
FIG. 1 is a diagrammatic perspective view of a motor vehicle steering system.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art The present disclosure generally relates to an electromechanical power steering system for a vehicle. In one example, such a steering system may comprise a worm that can be driven rotationally about a drive axis by an electric motor, that interacts with a worm gear which is coupled to a steering shaft, and that is mounted such that it can be rotated about the drive axis in a bearing that is held in a holder which can be moved relative to the worm gear.

In the case of an electromechanical power steering system for a motor vehicle, comprising a worm which can be driven rotationally about a drive axis by an electric motor, interacts with a worm gear which is coupled to a steering shaft, and is mounted such that it can be rotated about the drive axis in a bearing which is held in a holder which can be moved relative to the worm gear, it is provided according to the invention that the holder has a core element which is made from a core material and is connected to at least one contact element which is made from a soft material which can be deformed elastically more easily and is softer relative to the core material.

The holder according to the invention has, as a core element, a substantially rigid and inherently stable carrier structure which is formed from an inherently stable hard component, for example from a relatively strong core material which is as far as possible not deformed or is deformed merely slightly under the operating loads which occur, for example a cast material or a thermoplastic polymer which can be processed using plastic injection molding, for example glass fiberreinforced polyamide (PA), preferably with a defined hardness which is also called core hardness for short in the following text. According to the invention the core element is connected at least on its surface, what is known as the core surface, in functionally specified contact regions to at least one contact element made from a soft material which is softer relative to the core material. The soft material has, for example, a smaller Shore hardness, and can advantageously be a thermoplastic, rubber-elastic elastomer, for example thermoplastic polyurethane (TPU) or thermoplastic polyolefin vulcanizates (TPV).

One or more contact elements can be arranged on the outside on the holder in at least one contact region which can come into mechanical contact during operation with other components of the power steering system, for example a bearing or housing part of the mechanism housing.

Mechanical disturbances which act from the outside on the holder during operation, for example drive vibrations or mechanical pulses, strike a contact element as a result, which contact element is deformed elastically as a consequence thereof and in the process absorbs mechanical energy by way of internal friction of the soft material. This results in the advantage that mechanical disturbances as a result of vibrations and the like are damped and are not transmitted or are transmitted merely in an attenuated manner to the core element. As a result, the development of noise is reduced.

Resonant vibrations of the holder can also be damped by virtue of the fact that the core element is covered or enclosed at least in sections by way of soft material, which likewise has a positive effect with regard to a lower development of noise.

Moreover, the transmission of vibrations and mechanical pulses from the holder to other parts of the power steering system, for example housing parts of the mechanism housing, prestressing apparatuses or the like, can also be reduced effectively by way of the soft material by virtue of the fact that a contact element is positioned in a contact region on the core surface where mechanical contact between the holder and the power steering system can occur. As a result, undesired disruptive noise is likewise reduced.

The core material is preferably a thermoplastic polymer (TP) and the soft material is preferably a thermoplastic elastomer (TPE). As a result, it is made possible in an advantageous way that the holder is configured as a two-component injection molded part, in the case of which the core element and at least one contact element are connected using the two-component plastic injection molding method. Here, the core element can be molded in a first step from a polymer which is overmolded, in a further step, at least in regions by way of the soft material. As a result, efficient manufacturing is made possible, in the case of which the shape, the arrangement and the dimensions of the contact element can be designed in an optimum manner. Here, a permanently durable, integrally joined and possibly additionally positively locking connection between the core material and the soft material can be produced.

One advantageous embodiment of the invention provides that the bearing has a bearing ring which is attached in the holder in a bearing seat, and makes contact with a contact element which is arranged in the bearing seat. The bearing can be, for example, an anti-friction bearing, a bearing inner ring being mounted rotatably via rolling bodies in the outer bearing ring. The bearing seat can preferably be configured as a bearing seat opening which is coaxial with respect to the drive axis and, on its inner circumference which supports the bearing ring, has at least one contact element which bears against the bearing ring. The contact element can preferably enclose the bearing ring continuously or at least in sections, with the result that the bearing ring does not come into direct contact with the core element. As a result, the transmission of mechanical disruptions from the bearing to the holder as a result of drive vibrations or a load change can be damped by the soft material. A further advantage is that dimensional tolerances between the bearing and the bearing receptacle can be compensated for by way of the resilient soft material, as a result of which the manufacturing and assembly complexity can be reduced.

It can be provided that the bearing seat has at least one supporting element which is configured in one piece with the core element. A supporting element can comprise, for example, a tooth-like or rib-like projection which projects radially to the inside in the bearing seat opening. A plurality of supporting elements can preferably be arranged distributed over the circumference, with the result that the core element has a type of internally toothed structure. The support element or elements supports/support and positions/position the bearing in the bearing seat. The support element or elements is/are manufactured in one piece with the core element, preferably using the casting or injection molding method, and is/are surrounded by the soft material, the contact element which is formed as a result projecting radially to the inside at least in the circumferential region between the supporting element or elements. One advantage is that the soft material can have a greater radial dimension in the radially recessed region outside the supporting element or elements, which results in a greater damping action. Moreover, the contact element which is toothed with the supporting element or elements forms a positively locking connection which is active in the circumferential direction, as a result of which the load-bearing capacity of the connection is increased.

It is also conceivable and possible as one development that the bearing ring is connected in an integrally joined manner to the soft material, for example by way of overmolding, or else by way of welding or adhesive bonding.

The worm, the worm gear and the holder are preferably arranged and mounted in a mechanism housing. The holder together with that bearing of the worm which is received therein is mounted in the mechanism housing such that it can be moved relative to the latter.

It can be provided that a contact element configures a damping body which projects to the outside from the holder. The damping body can preferably be arranged so as to project radially to the outside with regard to the drive axis from the holder in the region of the bearing seat, and can form a stop damper there. If the worm moves away from the worm gear in the case of load changes, the holder can come into contact on the inside by way of the damping body against the mechanism housing, the stop being cushioned and damped by way of the soft material of the damping body. As a result, the development of noise is reduced.

The damping body can be attached in an outwardly open recess of the core element. The recess can be configured as a depression or opening which is introduced from the outside into the core element such that it is directed radially inward with regard to the drive axis. The material thickness of the soft material which is active for damping purposes in the direction of the stop can then be predefined by way of the depth of the recess measured from the outside.

It can be provided that the damping body projects out of the recess to the outside in a convexly curved manner. The damping body is given a shape which converges toward the outside in a tapered manner, for example in a spherical cap-shaped manner. As a result, in the case of impact, it first of all comes into contact by way of a small contact area with the corresponding area on the housing, and is compressed further progressively in the case of a greater deflection. In this way, a spring and damping characteristic can be predefined in an adapted manner by way of the design of the convex shape.

One advantageous development is that the recess passes through as far as into the bearing seat, a contact element of the bearing seat and a damping element being connected in one piece to one another through the recess. In this embodiment, the recess forms a channel-like opening which passes through transversely from the outside in the core element, that is to say substantially radially with regard to the drive or worm axis as far as the bearing seat. The opening is preferably configured as a bore which opens radially from the outside into the inner wall of the bearing seat opening. The soft material of the damping element which is arranged in the recess extends through said bore and is connected here in one piece to the contact element which is arranged in the bearing seat. In other words, a single-piece, continuous soft material body is configured which has the outwardly projecting damping element of the stop damper and also the contact element which receives the bearing in the bearing seat. One advantage here is that an improved damping action which can be set within broad limits can be predefined for the damping element on account of the great depth of the continuous recess. As a result, further improved decoupling of the holder with respect to mechanical disturbances is made possible. A further advantage is the additional positively locking anchoring of the damping element and the contact element of the bearing seat to the holder and among one another. Furthermore, it is advantageous in terms of manufacturing technology that the damping element and the contact element can be molded onto the core element using the two-component injection molding process via a single injection point without additional runners, as a result of which the manufacturing is simplified.

The holder can be configured as a pivoting lever or eccentric lever which can be pivoted relative to the worm gear about a pivot axis which is spaced apart from the drive axis. The pivot axis can be arranged substantially parallel to the drive axis, or in an inclined manner with respect to the latter. The pivoting mounting can comprise an axle pin which is connected fixedly to the pivoting lever and is mounted rotatably in the mechanism housing, or which is connected non-rotatably to the mechanism housing and is mounted rotatably in the pivoting lever.

Furthermore, it is conceivable and possible that the soft material extends over the bearing seat of the pivoting lever in the direction of a bearing bore or is arranged and anchored there between ribs or projections of the core element. In other words, the soft material can also be provided in a region between the bearing seat and the bearing bore, and can likewise be connected to the core element using the two-component injection molding method. Furthermore, it is also conceivable and possible that the soft component extends as far as into the bearing bore of the axle pin and is in direct contact with the latter.

In order to keep the worm under prestress in engagement with the worm gear, it is advantageous that the holder is prestressed by a spring element in the direction of the worm gear. If the holder is configured as a pivoting lever, a compression, tension or leg spring can be arranged between the mechanism housing and the pivoting lever in such a way that the bearing seat together with the bearing and that end of the worm which is mounted therein is pressed resiliently into the active engagement with the toothing system.

As an alternative or in addition, a prestressing element can comprise an elastic body, for example a rubber-elastic elastomer body, which is inserted between the mechanism housing and a contact element which is arranged as a damper body on the outside on the holder. The prestressing element can then exert the prestressing force, by way of which the worm is loaded against the worm gear, via the contact element on the holder, for example a pivoting lever. The prestressing element is damped mechanically with respect to the housing by way of the damper body.

FIG. 1 diagrammatically shows a motor vehicle steering system 100 which is configured as an electromechanical power steering system, it being possible for a driver to introduce a steering torque (steering moment) as a steering command into a steering shaft 1 via a steering wheel 102. The steering torque is transmitted via the steering shaft 1 to a steering pinion 104 which meshes with a rack 106 which then for its part transmits the predefined steering angle to the steerable wheels 110 of the motor vehicle via a displacement of the track rods 108.

An electric power assistance means can be provided in the form of a power assistance means 112 which is coupled on the input side to the steering shaft 1, a power assistance means 114 which is coupled to the pinion 104, and/or a power assistance means 116 which is coupled to the rack 106. The respective power assistance means 112, 114 or 116 couples an auxiliary torque into the steering shaft 1 and/or the steering pinion 104 and/or an auxiliary force into the rack 106, as a result of which the driver is assisted in the steering work. The three different power assistance means 112, 114 and 116 which are shown in FIG. 1 show possible positions for their arrangement.

Only a single one of the positions which are shown is usually occupied by a power assistance means 112, 114 or 116. The auxiliary torque or the auxiliary force which is to be applied by means of the respective power assistance means 112, 114 or 116 in order to assist the driver is defined with consideration of a steering torque which is introduced by the driver and is determined by a torque sensor 118. As an alternative to or in combination with the introduction of the auxiliary torque, an additional steering angle can be introduced into the steering system by the power assistance means 112, 114, 116, which additional steering angle is added to the steering angle which is applied by the driver via the steering wheel 102.

On the input side, the steering shaft 1 has an input shaft 10 which is connected to the steering wheel 102 and, on the output side, has an output shaft 12 which is connected to the rack 106 via the steering pinion 104. The input shaft 10 and the output shaft 12 are coupled to one another in a torsionally flexible manner via a torsion bar 119 (cannot be seen in FIG. 1). In this way, a torque which is input into the input shaft 10 by a driver via the steering wheel 102 always leads to a relative rotation of the input shaft 10 with regard to the output shaft 12 when the output shaft 12 does not rotate exactly synchronously with respect to the input shaft 10. Said relative rotation between the input shaft 10 and the output shaft 12 can be measured via a rotary angle sensor, and a corresponding input torque relative to the output shaft 12 can be determined accordingly on account of the known torsional rigidity of the torsion bar. In this way, the torque sensor 118 is configured by way of the determination of the relative rotation between the input shaft 10 and the output shaft 12. A torque sensor 118 of this type is known in principle and can be, for example, an electromagnetic sensor arrangement, or can be realized by way of a different measurement of the relative rotation.

Accordingly, a steering torque which is applied by the driver via the steering wheel 102 to the steering shaft 1 or the input shaft 10 will bring about the input of an auxiliary torque by way of one of the power assistance means 112, 114, 116 only when the output shaft 12 is rotated relative to the input shaft 10 counter to the rotational resistance of the torsion bar.

As an alternative, the torque sensor 118 can also be arranged at the position 118', the division of the steering shaft 1 into input shaft 10 and output shaft 12 and the torsionally flexible coupling via the torsion bar then being present accordingly at a different position, in order for it to be possible for a relative rotation and therefore correspondingly an input torque and/or an auxiliary torque to be introduced to be determined from the relative rotation of the output shaft 12 which is coupled to the input shaft 10 via the torsion bar.

Furthermore, the steering shaft 1 according to FIG. 1 comprises at least one Cardan joint 120, by means of which the course of the steering shaft 1 in the motor vehicle can be adapted to the spatial conditions.

Figure 2:
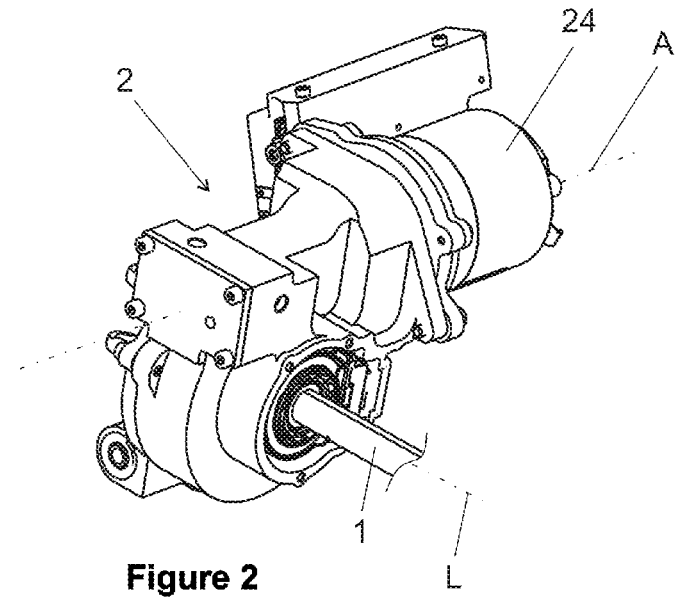
FIG. 2 is a diagrammatic perspective view without a mechanism housing (housing) of the mechanism elements of a gear mechanism according to FIG. 2.

In the example which is shown, the power assistance means 112 or 114 comprises a gear mechanism 2 which forms a steering assistance mechanism. The gear mechanism 2 is shown in FIG. 2 in a perspective view, and in FIG. 3 in a diagrammatic view, in the case of which the mechanism housing 21 is omitted for improved clarity and exposes a view into the interior of the gear mechanism 2.

Figure 3C:
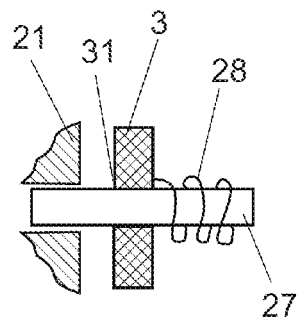
FIG. 3c is a diagrammatic illustration of the mounting of the holder according to FIG. 3a in a second embodiment.
Figure 3B:
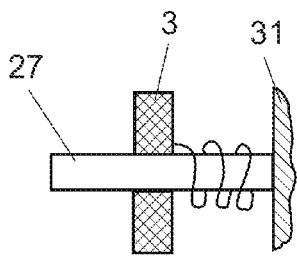
FIG. 3b is a diagrammatic illustration of the mounting of the holder according to FIG. 3a in a first embodiment.
Figure 3:
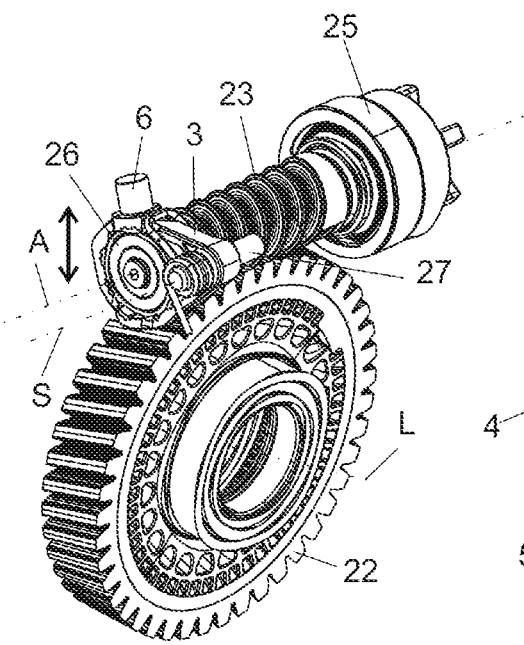
FIG. 3 is a further diagrammatic perspective view without a mechanism housing (housing), the mechanism elements of a gear mechanism according to FIG. 2.

The gear mechanism has a mechanism housing 21, also called a housing 21 for short in the following text. A worm gear 22 which is connected fixedly to the steering shaft 1 for conjoint rotation is mounted in the housing 21 such that it can be rotated about the longitudinal axis L. A worm 23 is in tooth engagement with the worm gear 22 in order to form a worm gear mechanism, and can be driven rotationally about the drive axis A which is identical to the worm axis by an electric motor 24 which is flange-connected to the housing 21. As can be seen in FIG. 3, the drive axis A lies substantially perpendicularly with respect to the longitudinal axis L.

Figure 3A:
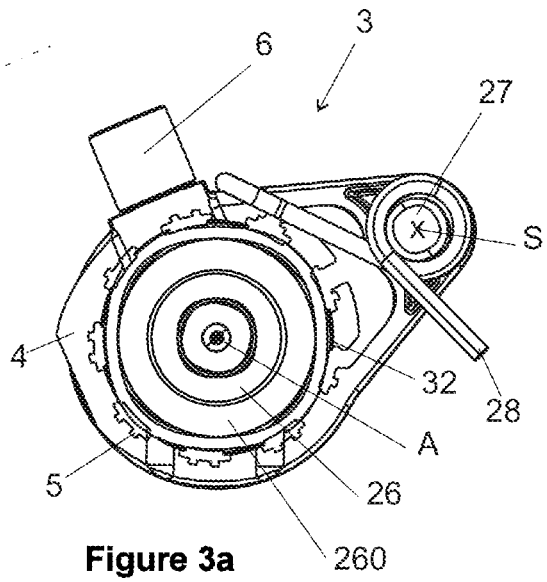
FIG. 3a is an axial view in the direction of the drive axis and a holder according to the invention of a gear mechanism according to FIG. 2 or 3

At its end which is close to the motor (on the right in FIG. 3), the worm 23 is connected to the motor shaft via a clutch, in particular a claw clutch, of the motor 24, and is mounted in a bearing 25 such that it can be rotated about the drive axis A. At its end which is remote from the motor (on the left in FIG. 3), the worm 23 is mounted in a bearing 26. The bearing 26 is received in a holder which is configured as a pivoting lever 3 and makes a compensation movement of the bearing 26 and therefore the worm 23 toward the worm gear 22 and away from the worm gear 22 possible, as is indicated in FIG. 3 by way of the double arrow. To this end, the pivoting lever 3, which is shown in FIG. 3a on an enlarged scale in an axial view from the side which is remote from the motor in the direction of the drive axis A, is mounted in the housing 21 such that it can be pivoted about a pivot axis S which runs at a spacing from and substantially parallel to the drive axis A. For mounting about the pivot axis S, the pivoting lever 3 is mounted rotatably by way of a bearing bore 31 on an axle pin 27 which is held by the housing 21 and serves as a bearing journal. This is shown diagrammatically in FIG. 3b. As an alternative, the axle pin 27 can be fixed firmly in the bearing bore 31 and can be mounted rotatably in the housing 21, as shown diagrammatically in FIG. 3c.

A spring element 28 which is configured as a leg spring is arranged on the axle pin 27 and is supported with one leg on the housing 21 and with the other leg from the outside against the pivoting lever 3, with the result that the latter is pressed elastically against the worm gear 22 in the pivoting direction about the pivot axis S by way of the spring force.

Figure 4:
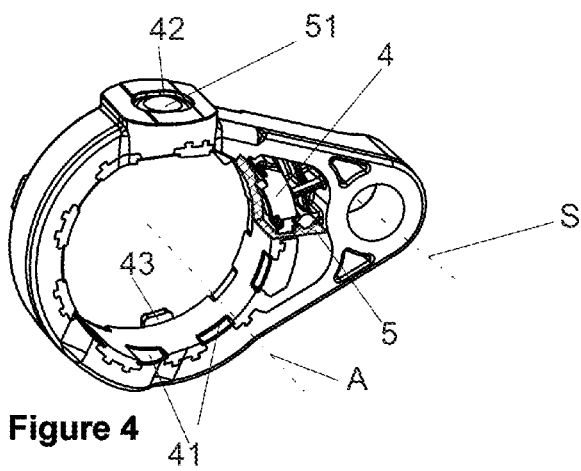
Figure 5:
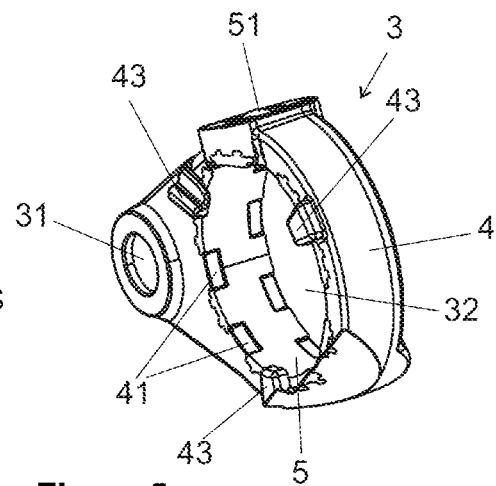
FIG. 5 is a further perspective view of the pivoting lever according to FIG. 4.

The pivoting lever 3 is shown individually in different perspectives in FIGS. 4 and 5.

The bearing 26 is preferably configured as an anti-friction bearing, and has an outer bearing ring 260 which is attached such that it cannot be rotated in a bearing seat 32 in the pivoting lever 3. The bearing seat 32 is formed by way of a bearing seat opening which passes through coaxially with respect to the drive axis A.

The pivoting lever 3 has a core element 4 which is configured as a plastic injection molded part made from a thermoplastic polymer (TP) which forms the core material and has a relatively high strength and inherent stability, such as, for example, PA 66-GF50. The bearing seat 32 has a contact element 5 which runs around over its inner wall and is formed by way of a soft material which is connected to the core element 4 using the two-component injection molding method and is preferably a thermoplastic elastomer which has a lower Shore hardness than the core material of the core element 4 and can be deformed in a rubber-elastic manner, for example TPU.

Figure 6:
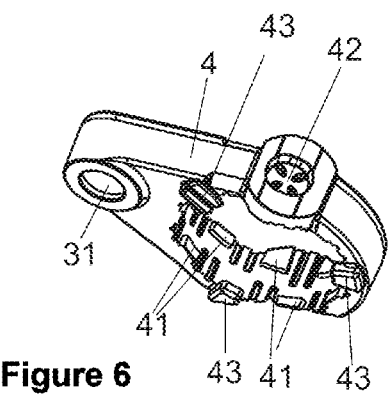
FIG. 6 is a further perspective view of a core element of the pivoting lever according to FIG. 4 or 5.

The core element 4 which is shown individually without the contact element 5 in FIG. 6 has supporting elements 41 which project radially inward into the bearing seat 32 and are arranged offset in a manner which is distributed over the circumference. The supporting elements 41 are surrounded at least partially by the soft material of the contact element 4, and project radially beyond it, with the result that, in the assembled state according to FIG. 3a, the bearing ring 260 is connected exclusively or at least predominantly to the soft material of the contact element 4. Furthermore, the soft material also extends in the direction of the bearing bore 31, and can therefore at least partially take up the region between the bearing seat 32 and the bearing bore 31, as shown in FIG. 4 in the partial sectional view.

The bearing bore 31 is configured in the core element 4. The bearing bore 31 can comprise the soft material at least partially, for example in the engagement region of the axle pin 27.

A stop damper 51 is arranged in an opening 42 which is open radially toward the outside in the core element 4 as viewed from the drive axis A, which stop damper 51, as a further contact element, is likewise configured from the abovementioned soft material and is likewise connected to the core element 4 using the two-component injection molding method. As shown in FIG. 10a which shows a section through the pivoting lever 3 transversely with respect to the drive axis A, the soft component flows through the cutouts in the region of the opening 42 and extends further in one piece along the inner circumferential face of the bearing seat 32 and as far as into the interior of the pivoting bearing.

Figure 7:
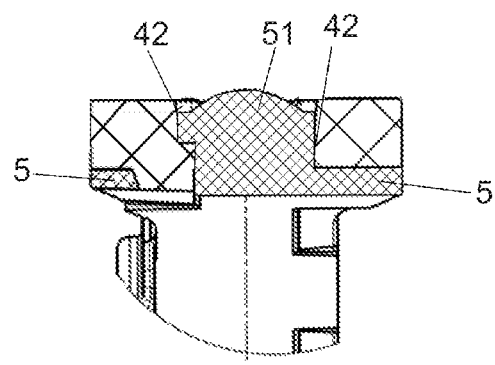
FIG. 7 is an enlarged detail view of a section through the pivoting lever according to FIG. 4 or 5 along the drive axis.

The stop damper 51 protrudes to the outside from the pivoting lever 3 in a spherical cap-shaped curved manner, as can be seen clearly in that longitudinal section in the direction of the drive axis A which is shown in FIG. 7.

Furthermore, it can be gathered from FIG. 7 that the opening 42 in the core element 4 passes through from the outside as far as into the bearing seat 32, that is to say opens radially into the inner wall of the bearing seat opening. Here, the stop body 51 is connected through the opening 42 in one piece to the contact element 5 on the inner wall of the bearing seat 32. In other words, the stop body 51 is formed by way of a radially projecting, single-piece shaped-out formation of the contact element 5.

A prestressing element 6 can be arranged between the stop body 51 and the housing 21. Said prestressing element 6 can be of spring-elastic or rubber-elastic configuration, and can exert a prestressing force which is directed counter to the worm gear 22 on the pivoting lever 3 via the stop damper 51.

FIGS. 9 and 10 show axial views of the pivoting lever 3. On the end side which faces the observer in FIG. 9 and faces away from the observer in FIG. 10, the core element 4 has positioning elements 43 which project from the outside radially into the bearing seat 32 and against which the bearing 26 bears axially in the assembled state.

LIST OF DESIGNATIONS

1 Steering shaft
10 Input shaft
12 Output shaft
100 Motor vehicle steering system
102 Steering wheel
103 Steering gear
104 Steering pinion
106 Rack
108 Track rod
110 Wheel
112 Power assistance means
114 Power assistance means
116 Power assistance means
118 Torque sensor
118' Torque sensor
119 Torsion bar
120 Joint
2 Gear mechanism
21 Housing
22 Worm gear
23 Worm
24 Motor
25 Bearing
26 Bearing
260 Bearing ring
27 Axle pin
28 Spring element
3 Pivoting lever
31 Bearing bore
32 Bearing seat
4 Core element
41 Supporting elements
42 Opening
43 Positioning elements
5 Contact element
51 Stop damper
6 Prestressing element
A Drive axis
L Longitudinal axis
S Pivot axis

What is claimed is:

1. An electromechanical power steering system for a vehicle, comprising:
    a holder that includes a core element that is made from a core material and is connected to a contact element, wherein the contact element is comprised of a soft material that is more easily elastically deformed and that is softer than the core material; and
    a worm that is rotatably drivable about a drive axis by an electric motor, that interacts with a worm gear that is coupled to a steering shaft, and that is mounted such that the worm is rotatable about the drive axis in a bearing that is held in the holder, with the holder being movable relative to the worm gear;
    wherein the contact element is a damping body hat projects to an outside from the holder;
    wherein the damping body is attached in an outwardly open recess of the core element;
    wherein the outwardly open recess passes through into a bearing seat of the bearing, wherein the contact element of the bearing seat and a damping element are connected in one piece to one another through the outwardly open recess.

2. The electromechanical power steering system of claim 1 wherein the core material is a thermoplastic polymer and the soft material is a thermoplastic elastomer.

3. The electromechanical power steering system of claim 1 wherein the holder is a two-component injection molded part, wherein the core element and the contact element are connected via two-component plastic injection molding.

4. The electromechanical power steering system of claim 1 wherein the bearing includes a bearing ring that is attached in the holder in a bearing seat and makes contact with the contact element that is disposed in the bearing seat.

5. The electromechanical power steering system of claim 4 wherein the bearing seat includes a supporting element that is integral with the core element.

6. The electromechanical power steering system of claim 1 wherein the damping body projects out of the outwardly open recess to the outside in a convexly curved manner.

7. The electromechanical power steering system of claim 1 wherein the holder is biased by a spring element in a direction of the worm gear.

8. The electromechanical power steering system of claim 1 wherein the holder is configured as a pivoting lever that is pivotable relative to the worm gear about a pivot axis that is spaced apart from the drive axis.

9. The electromechanical power steering system of claim 8, further comprising a spring on an axle pin, wherein the spring presses the pivoting lever elastically against the worm gear in a pivoting direction about the pivot axis.

10. The electromechanical power steering system of claim 9, wherein the spring is a leg spring supported on the axle pin with a first leg on a housing and a second leg on the pivoting lever.

11. An electromechanical power steering system for a vehicle, comprising:
- a holder that includes a core element that is made from a core material and is connected to a contact element, wherein the contact element is comprised of a soft material that is more easily elastically deformed and that is softer than the core material; and
- a worm that is rotatably drivable about a drive axis by an electric motor, that interacts with a worm gear that is coupled to a steering shaft, and that is mounted such that the worm is rotatable about the drive axis in a bearing that is held in the holder, with the holder being movable relative to the worm gear;
- wherein the holder is configured as a pivoting lever that is pivotable relative to the worm gear about a pivot axis that is spaced apart from the drive axis and wherein a spring on an axle pin presses the pivoting lever elastically against the worm gear in a pivoting direction about the pivot axis.

12. The electromechanical power steering system of claim 11, wherein the spring is a leg spring supported on the axle pin with a first leg on a housing and a second leg on the pivoting lever.

\* \* \* \* \*